United States Patent
Li et al.

(10) Patent No.: US 10,693,598 B2
(45) Date of Patent: Jun. 23, 2020

(54) CONFIGURATION METHOD FOR SENDING AND RECEIVING DATA AND AN APPARATUS THEREOF

(71) Applicant: YULONG COMPUTER TELECOMMUNICATION SCIENTIFIC (SHENZHEN) CO., LTD., Shenzhen (CN)

(72) Inventors: Mingju Li, Shenzhen (CN); Yunfei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 144 days.

(21) Appl. No.: 16/005,640

(22) Filed: Jun. 11, 2018

(65) Prior Publication Data

US 2018/0367257 A1 Dec. 20, 2018

(30) Foreign Application Priority Data

Jun. 16, 2017 (CN) .......................... 2017 1 0459659

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/0057* (2013.01); *H04L 1/189* (2013.01);
(Continued)

(58) Field of Classification Search
CPC ........... H04W 72/042; H04W 72/0413; H04W 72/0453; H04W 72/1289; H04W 88/02; H04W 72/1284; H04L 1/0013; H04L 5/0023; H04L 1/1812; H04L 1/0057; H04L 1/1845; H04L 1/1887; H04L 1/189
See application file for complete search history.

(56) References Cited

U.S. PATENT DOCUMENTS

2012/0057545 A1 3/2012 Hariharan et al.
2018/0368110 A1* 12/2018 Ying ..................... H04W 72/04

FOREIGN PATENT DOCUMENTS

CN 102362459 A 2/2012
WO 2014031450 A2 2/2014

OTHER PUBLICATIONS

Extended European Search Report issued in parallel European Application No. 18171385.0-1219, dated Oct. 8, 2018, 14 pages.
(Continued)

*Primary Examiner* — April Y Blair
*Assistant Examiner* — Sazzad Hossain
(74) *Attorney, Agent, or Firm* — Bayes PLLC

(57) ABSTRACT

The present disclosure provides a configuration method for sending and receiving data and an apparatus thereof, the method comprises receiving a first configuration signal sent from a network device by a terminal device, wherein, the first configuration signal is for indicating whether a first Transport Block to be sent by the network device is a retransmitted Transport Block, and the first configuration signal contains DCI information of the first Transport Block; receiving the first Transport Block sent from the network device by a terminal device, wherein, the first Transport Block comprises at least one Code Block Group; decoding the Code Block Group in the first Transport Block by a terminal device according to the DCI information of the first Transport Block. The technical scheme provided by the present disclosure has an advantage of greater correct rate of data transmission.

17 Claims, 4 Drawing Sheets

(51) Int. Cl.
  *H04W 72/04* (2009.01)
  *H04L 5/00* (2006.01)
  *H04W 72/12* (2009.01)
  *H04W 88/02* (2009.01)

(52) U.S. Cl.
  CPC .......... *H04L 1/1845* (2013.01); *H04L 1/1887* (2013.01); *H04W 72/042* (2013.01); *H04L 1/0013* (2013.01); *H04L 5/0023* (2013.01); *H04W 72/0453* (2013.01); *H04W 72/1284* (2013.01); *H04W 72/1289* (2013.01); *H04W 88/02* (2013.01)

(56) References Cited

OTHER PUBLICATIONS

Intel Corporation, "Scheduling of CBG-based transmissions", 3GPP TSG-RAN WG1 #89, R-1707413, Hangzhou, P.R. China, May 15-19, 2017, 3 pages.

Sequans Communications, "On multiplexing of URLLC and eMBB in DL", 3GPP TSG-RAN WG1 Meeting #88bis, R-1708954, Hangzhou, China May 15-19, 2017, 6 pages.

Samsung, "Summary of e-mail discussions on multiplexing eMBB and URLLC in DL", TSG-RAN WG1 NR Ad-hoc Meeting, R1700972, Spokane, USA Jan. 16-20, 2017, 24 pages.

Coolpad, "Pre-emption indication and Sub-sequent transmission", 3GPP TSG RAN WG1 Meeting #89, R-1708745, Hangzhou, P.R. China, May 15-19, 2017, 4 pages.

First Office action issued in corresponding Chinese Patent Application No. 201710459659.7, dated Oct. 16, 2019, with English Translation 18 pages.

"Scheduling of CBG-based transmissions," 3GPP TSG RAN WG1 Meeting #89, Hangzhou, P.R.China, May 15-19, 2017, Agenda Item 7.1.33.5, Source: Intel Corporation, 8 pages.

"On multiplexing of URLLC and eMBB in DL," 3GPP TSG RAN WG1 Meeting #88bis, Hangzhou, China, May 15-19, 2017, Agenda Item 7.1.33.6, Source: Sequans Communications, 6 pages.

* cited by examiner

CONFIGURATION METHOD FOR SENDING AND RECEIVING DATA AND AN APPARATUS THEREOF

CROSS REFERENCE

This application claims priority of Chinese Patent Application No. 201710459659.7 filed on Jun. 16, 2017, entitled "A configuration method for sending and receiving data and an apparatus thereof", which is incorporated herein by reference in its entirety.

TECHNICAL FIELD

The present disclosure relates to the technical field of wireless communication, and in particular relates to a configuration method for sending and receiving data and an apparatus thereof.

BACKGROUND

In a wireless transmission process, data is transmitted in time units of sub-frames, and one sub-frame usually transmits one Transport Block (TB).

In Hybrid Automatic Repeat request (HARQ) feedback, a receiving terminal gives feedback on whether or not the data sent from a sending terminal is correctly received. In a system of Long Time Evolution (LTE), the HARQ feedback is performed in units of TBs, and in the meantime, retransmission is also performed in units of TBs. In a New Radio (NR) system, the transmission time units occupied by one TB may be on or more OFDM symbols, one or more mini-slots, one or more slots. Since one TB in NR comprises a lot of Code Blocks (CBs), if the HARQ feedback is still in units of TBs, all the data in a TB would need to be retransmitted under the condition that only one or few CBs in the TB is falsely received, which wastes the system resource.

SUMMARY

In order to solve the above-mentioned problem, the embodiments of the present disclosure provide a configuration method for sending and receiving data and an apparatus thereof that is able to avoid unnecessary retransmission and increase the correct rate for reception of retransmission.

A first aspect of the embodiments of the present disclosure provides a configuration method for sending and receiving data, applied to a terminal device side, comprising:

receiving a first configuration signal sent from a network device by a terminal device, wherein, the first configuration signal is for indicating whether a first Transport Block to be sent by the network device is a retransmitted Transport Block, and the first configuration signal contains DCI information of the first Transport Block;

receiving the first Transport Block sent from the network device by a terminal device, wherein, the first Transport Block comprises at least one Code Block Group;

decoding the Code Block Group in the first Transport Block by a terminal device according to the DCI information of the first Transport Block.

In a possible design, if the first Transport Block is a retransmitted Transport Block, before decoding the Code Block Group in the first Transport Block, the method further comprises: determining the Code Block Group contained in the first Transport Block according to the DCI information of the first Transport Block.

In a possible design, the step of determining the Code Block Group contained in the first Transport Block according to the DCI information of the first Transport Block comprises: if the DCI information of the first Transport Block does not contain a Code Block Group indicator, determining the Code Block Group contained in the first Transport Block according to a location of a second target Code Block Group in a second Transport Block, wherein, the second target Code Block Group is a Code Block Group which is falsely received in the second Transport Block, the second Transport Block is a received Transport Block with the same HARQ process number as that of the first Transport Block.

In a possible design, before receiving the first Transport Block sent by the network device, the method further comprises: receiving a preemption indication sent by the network device, wherein, the preemption indication is for indicating part of or all of the time-frequency resource in the second Transport Block that corresponds to a second Code Block Group; the step of determining the Code Block Group contained in the first Transport Block according to the DCI information of the first Transport Block comprises: if the DCI information of the first Transport Block does not contain a Code Block Group indicator, determining that the Code Block Group contained in the first Transport Block is the second Code Block Group, part of or all of the time-frequency resource of which is occupied by Code Block Groups sent to another terminal device through the network device.

In a possible design, the step of determining the Code Block Group contained in the first Transport Block according to the DCI information of the first Transport Block comprises: if the DCI information of the first Transport Block contains a Code Block Group indicator, determining the Code Block Group contained in the first Transport Block according to the Code Block Group indicator in the DCI information of the first Transport Block.

In a possible design, the step of decoding the Code Block Group in the first Transport Block according to the first configuration signal comprises: determining a first target Code Block Group in the first Transport Block to be a first retransmitted Code Block Group or a second retransmitted Code Block Group according to the DCI information of the first Transport Block; if the first target Code Block Group is determined to be the first retransmitted Code Block Group, performing combined decoding for the first target Code Block Group with a first Code Block Group, wherein, the first Code Block Group is a Code Block Group having the same location in a second Transport Block as the first target Code Block Group in the first Transport Block, the second Transport Block is a received Transport Block with the same HARQ process number as that of the first Transport Block; if the first target Code Block Group is determined to be the second retransmitted Code Block Group, deleting a second Code Block Group and decoding the second retransmitted Code Block Group, wherein, the second Code Block Group is a Code Block Group having the same location in the second Transport Block as the second retransmitted Code Block Group in the first Transport Block.

In a possible design, before receiving the first Transport Block sent by the network device, the method further comprises: receiving a preemption indication sent by the network device, wherein, the preemption indication is for indicating part of or all of the time-frequency resource in the second Transport Block that corresponds to the second Code Block Group; the step of determining a first target Code Block Group in the first Transport Block to be a first retransmitted Code Block Group or a second retransmitted Code Block Group according to the DCI information of the first Transport Block comprises: if the DCI information of the first Transport Block does not contain a Code Block Group decoding manner, determining that the Code Block Group having the same location as that of the second Code Block Group is the second retransmitted Code Block Group, wherein, part of or all of the time-frequency resource of the second Code Block Group is occupied by Code Block Groups sent to another terminal device through the network device.

In a possible design, the step of determining a first target Code Block Group in the first Transport Block to be a first retransmitted Code Block Group or a second retransmitted Code Block Group according to the DCI information of the first Transport Block comprises: if the DCI information of the first Transport Block contains a Code Block Group decoding manner, determining the first target Code Block Group in the first Transport Block to be the first retransmitted Code Block Group or the second retransmitted Code Block Group according to the Code Block Group decoding manner in the DCI information of the first Transport Block.

In a possible design, the step of determining a first target Code Block Group in the first Transport Block to be a first retransmitted Code Block Group or a second retransmitted Code Block Group according to the DCI information of the first Transport Block comprises: if the DCI information of the first Transport Block does not contain a Code Block Group decoding manner and there is no preemption indication received, determining all Code Block Groups in the first Transport Block to be the first retransmitted Code Block Group.

In a possible design, the method further comprises: determining whether the DCI information of the first Transport Block contains a Code Block Group indicator and/or a Code Block Group decoding manner according to an information domain size and/or a DCI format of the DCI information of the first Transport Block.

In a possible design, the method further comprises: determining whether the DCI information of the first Transport Block contains a Code Block Group indicator and/or a Code Block Group decoding manner according to whether a preset indicator bit exists in the DCI information of the first Transport Block.

In a possible design, the method further comprises: determining whether the DCI information of the first Transport Block contains a Code Block Group indicator and/or a Code Block Group decoding manner according to the signal carrier that the first Transport Block is on.

In a possible design, the step of receiving a first configuration signal sent by a network device comprises: seeking to acquire the first configuration signal that contains the DCI information of the first Transport Block from PDCCH information according to at least one preset information domain size of DCI information and at least one preset DCI format.

In a possible design, before receiving the first configuration signal sent by the network device, the method further comprises: receiving a second configuration signal sent by the network device, wherein, the second configuration signal is for instructing to detect one or more of the following four types of DCI information: a first DCI information which contains a Code Block Group indicator and a Code Block Group decoding manner; a second DCI information which contains a Code Block Group indicator and does not contain a Code Block Group decoding manner; a third DCI information which contains a Code Block Group decoding manner and does not contain a Code Block Group indicator; a fourth DCI information which does not contain a Code Block Group indicator or a Code Block Group decoding manner.

In a possible design, the step of seeking to acquire the first configuration signal that contains the DCI information of the first Transport Block from PDCCH information according to at least one preset information domain size of DCI information and at least one preset DCI format comprises: seeking to acquire the first configuration signal that contains the DCI information of the first Transport Block from PDCCH information according to the second configuration signal in combination with the at least one preset information domain size of DCI information and at least one preset DCI format.

In a possible design, the at least one preset information domain size of DCI information and at least one preset DCI format comprises: one type of information domain size of DCI information and at least two different types of DCI formats; or at least two different types of information domain sizes of DCI information and one type of DCI format; or at least two different types of information domain sizes of DCI information and at least two different types of DCI formats.

A second aspect of the embodiments of the present disclosure provides a configuration method for sending and receiving data, applied to a network device side, comprising:
    sending a first configuration signal to a terminal device, wherein, the first configuration signal is for indicating whether a first Transport Block is a retransmitted Transport Block, and the first configuration signal contains DCI information of the first Transport Block;
    sending the first Transport Block to the terminal device, wherein, the first Transport Block comprises at least one Code Block Group.

In a possible design, before sending the first Transport Block to the terminal device, the method further comprises: sending a preemption indication to the terminal device, wherein, the preemption indication is for indicating part of or all of the time-frequency resource in a second Transport Block that corresponds to a second Code Block Group, wherein, the second Transport Block is a Code Block Group already sent to the terminal device and having the same HARQ process number as that of the first Transport Block, part of or all of the time-frequency resource corresponding to the second Code Block Group is occupied by Code Block Groups sent to another terminal device.

In a possible design, before sending the first configuration signal to the terminal device, the method further comprises: sending a second configuration signal to the terminal device, wherein, the second configuration signal is for instructing the terminal device to simultaneously detect at least one of the following four types of DCI information: a first DCI information which contains a Code Block Group indicator and a Code Block Group decoding manner; a second DCI information which contains a Code Block Group indicator and does not contain a Code Block Group decoding manner; a third DCI information which contains a Code Block Group decoding manner and does not contain a Code Block Group indicator; a fourth DCI information which does not contain a Code Block Group indicator or a Code Block Group decoding manner.

In a possible design, if the first Transport Block is not a retransmitted Transport Block, the DCI information of the first configuration signal is the first DCI information, the second DCI information, the third DCI information, or the fourth DCI information; if the first Transport Block is a retransmitted Transport Block, under the condition that the first Transport Block does not contain a second retransmitted Code Block Group which has the same location as the second Code Block Group, the DCI information of the first configuration signal is the first DCI information, the second DCI information, the third DCI information, or the fourth DCI information; if the first Transport Block is a retransmitted Transport Block, under the condition that the first Transport Block contains a second retransmitted Code Block Group which has the same location as the second Code Block Group and that a preemption indication has been sent to the terminal device, the DCI information of the first configuration signal is the first DCI information, the second DCI information, the third DCI information, or the fourth DCI information.

In a possible design, if the first Transport Block is a retransmitted Transport Block, under the condition that the first Transport Block contains a second retransmitted Code Block Group which has the same location as the second Code Block Group and that no preemption indication has been sent to the terminal device, the DCI information of the first configuration signal is the first DCI information or the third DCI information.

In a possible design, the second configuration signal is also for indicating DCI information to be detected by the terminal device on at least one target signal carrier, wherein, the first Transport Block is transmitted on the at least one target signal carrier.

A third aspect of the embodiments of the present disclosure provides a terminal device that comprises:
- a receiving unit, for receiving a first configuration signal sent by a network device, wherein, the first configuration signal is for indicating whether a first Transport Block to be sent by the network device is a retransmitted Transport Block, and the first configuration signal contains DCI information of the first Transport Block;
- the receiving unit being also for receiving the first Transport Block sent by the network device, wherein, the first Transport Block comprises at least one Code Block Group;
- a processing unit, for decoding the Code Block Group in the first Transport Block according to the first configuration signal.

The terminal device provided by the third aspect of the embodiments of the present disclosure is for executing the configuration method for sending and receiving data provided by the first aspect of the embodiments of the present disclosure, and details can refer to the description of the first aspect of the embodiments of the present disclosure, which is not repeatedly described herein.

A fourth aspect of the embodiments of the present disclosure provides a network device that comprises:
- a sending unit, for sending a first configuration signal to a terminal device, wherein, the first configuration signal is for indicating whether a first Transport Block is a retransmitted Transport Block, and the first configuration signal contains DCI information of the first Transport Block;
- the sending unit being also for sending the first Transport Block to the terminal device, wherein, the first Transport Block comprises at least one Code Block Group.

The network device provided by the fourth aspect of the embodiments of the present disclosure is for executing the configuration method for sending and receiving data provided by the second aspect of the embodiments of the present disclosure, and details can refer to the description of the second aspect of the embodiments of the present disclosure, which is not repeatedly described herein.

A fifth aspect of the embodiments of the present disclosure provides a terminal device that comprises a processor, a memory and a transceiver interconnected, wherein, the transceiver is for receiving and sending data, the memory is for storing application program codes to support execution of the above-mentioned method by the terminal device, and the processor is configured to execute the method of the first aspect described above.

A sixth aspect of the embodiments of the present disclosure provides a network device that comprises a processor, a memory and a transceiver interconnected, wherein, the transceiver is for receiving and sending data, the memory is for storing application program codes to support execution of the above-mentioned method by the terminal device, and the processor is configured to execute the method of the second aspect described above.

A seventh aspect of the embodiments of the present disclosure provides a computer storage medium with a computer program stored therein, the computer program comprises program instructions that, when executed by a processor, causes the processor to execute the method of the first aspect described above.

An eighth aspect of the embodiments of the present disclosure provides a computer storage medium with a computer program stored therein, the computer program comprises program instructions that, when executed by a processor, causes the processor to execute the method of the second aspect described above.

In the embodiments of the present disclosure, the terminal device receives the first configuration signal sent by the network device so as to determine whether the first Transport Block is a retransmitted Transport Block, under the condition that the terminal device determines that the first Transport Block is a retransmitted Transport Block or is not a retransmitted Transport Block, the Code Block Group (CBG) in the first Transport Block is decoded according to the DCI information of the first Transport Block, so that the decoding manner of various Code Block Groups in a Transport Block can be precisely determined, therefore, the CBGs can be received with a greater correct rate, and unnecessary retransmission can be avoided.

BRIEF DESCRIPTION OF THE DRAWINGS

In order to more clearly describe the technical solutions in the embodiments of the present disclosure or in the prior art, hereinafter, the accompanying drawings used for describing the embodiments or the prior art will be briefly introduced. Apparently, the accompanying drawings described below are only directed to some embodiments of the present disclosure, and for a person skilled in the art, without expenditure of creative labor, other drawings can be derived on the basis of these accompanying drawings.

DETAILED DESCRIPTION OF EMBODIMENTS

A clear and complete description of the technical solutions of the embodiments of the present disclosure is given below, in conjunction with the accompanying drawings. Apparently, the embodiments described below are part of, but not all of, the embodiments of the present disclosure. All the other embodiments, obtained by a person skilled in the art on the basis of the embodiments described in the present disclosure without expenditure of creative labor, belong to the protection scope of the present disclosure.

Figure 1:
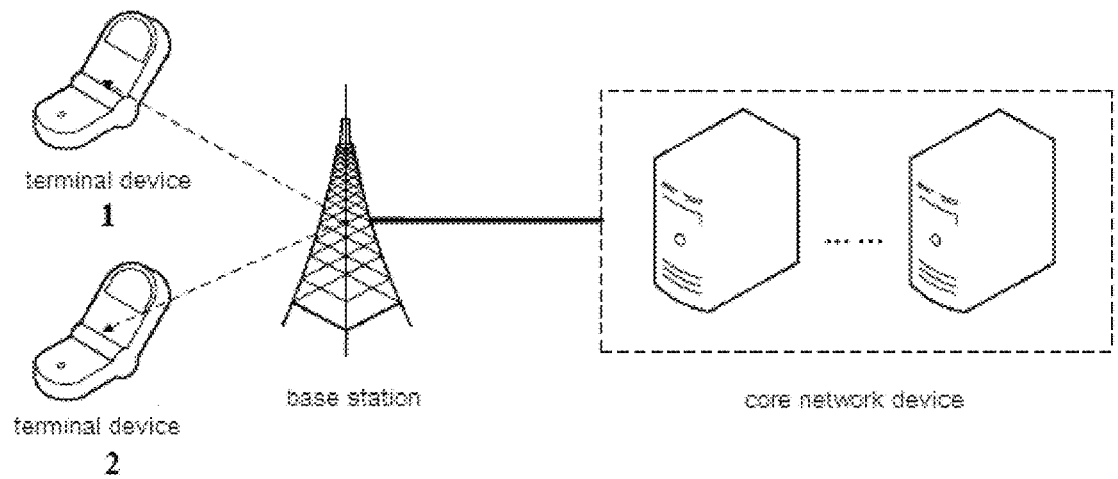
FIG. 1 is a schematic diagram of a wireless communication system architecture provided by the embodiments of the present disclosure.

The embodiments of the present disclosure may be applied to a wireless communication system which usually is composed of communication cells, each communication cell has a base station (BS) for providing communication service to a plurality of terminal devices, wherein the base station is connected to a core network device, as shown in FIG. 1. Wherein, the base station comprises a Baseband Unit (BBU) and a Remote Radio Unit (RRU). The BBU and the RRU may be placed in different locations, for example, the RRU is placed far in an open area for increasing traffic capacity, and the BBU is placed in a central machine room; the BBU and the RRU may also be placed in the same central machine room; the BBU and the RRU may also be different components under the same rack.

It should be noted that, the wireless communication system mentioned in the embodiments of the present disclosure includes, but not limited to, a Narrow Band-Internet of Things (NB-IoT) system, a Global System for Mobile Communication (GSM), an Enhanced Data rate for GSM Evolution (EDGE) system, a Wideband Code Division Multiple Access (WCDMA) system, a Code Division Multiple Access 2000 (CDMA2000) system, a Time Division-Synchronization Code Division Multiple Access (TD-SCDMA) system, a Long Time Evolution (LTE) system, a 5G system, or a future mobile communication system.

In the embodiments of the present disclosure, the base station is a device disposed in a wireless access network for providing wireless communication function to terminal devices. The base station includes various forms such as a macro base station, a micro base station (also called ministation), a relay station, an Access Point, a Transmission Receiver Point (TRP). In systems that use different wireless access technologies, the names of the device having a function of base station may be different, for example, in a 5G system, it is named generation NodeB (gNB); in an LTE system, it is named evolved NodeB (eNodeB or eNB); in a 3rd Generation (3G) system, it is named Node B (NB). For easy illustration, in all the embodiments of the present disclosure, the devices for providing wireless communication function to terminal devices are called by a joint name of network device.

The terminal device involved in the embodiments of the present disclosure may include various devices provided with wireless communication function, such as a handheld device, an onboard device, a wearable device, a computing device or other processing devices connected to a wireless Modulator-Demodulator (Modem). The terminal device may also be named Mobile Station (MS) or Terminal, and may include a subscriber unit, a cellular phone, a smartphone, a wireless data card, a Personal Digital Assistant (PDA), a tablet computer, a wireless Modem, a handset, a laptop computer, a Machine Type Communication (MTC) terminal. For easy illustration, in all the embodiments of the present disclosure, the devices mentioned above are called by a joint name of terminal device.

In order for a better understanding of the method of the embodiments of the present disclosure, firstly, the types of TBs and types of CBGs involved in the embodiments of the present disclosure are introduced.

In the embodiments of the present disclosure, the TBs involved are classified into the following two types:

A first type is non-retransmitted TB, also called TB transmitted for the first time, first transmitted TB, or initially transmitted TB. The non-retransmitted TB refers to a TB that has never been received before a terminal device receives the current TB. A second type is retransmitted TB, also called non-first time transmitted TB, TB transmitted again, or second time transmitted TB. The retransmitted TB refers to a TB that has already been received before a terminal device receives the current TB, which is a TB that already exists in the terminal device and has the same serial number or identity as the currently received TB. The transmission of a retransmitted TB can be regarded as an $N^{th}$ transmission (N is a positive integer greater than 1) of a non-retransmitted TB having a correspondence relation therewith, the correspondence relation between the retransmitted TB and the non-retransmitted TB may be that they have the same serial number/identity (the serial number/identity uniquely identifies one TB); the correspondence relation between the retransmitted TB and the non-retransmitted TB may also be that they have the same HARQ process number, wherein, the retransmitted TB and the non-retransmitted TB belong to the same HARQ process, the non-retransmitted TB is the first TB in the HARQ process corresponding to a target HARQ process number, and the target HARQ process number is the HARQ process number of the retransmitted TB.

Hereinafter, examples are given to illustrate a retransmitted TB and a non-retransmitted TB.

For example, when a network device sends 5 TBs to a terminal device, these 5 TBs are assigned the serial numbers of 1, 2, 3, 4, 5, and it is assumed that TBs with serial numbers of 1, 2, 3 already exist in the terminal device and TBs with serial numbers of 4, 5 do not exist in the terminal device, under such circumstances, when the TBs with serial numbers of 1, 2, 3 are currently transmitted by the network device, the network device is transmitting retransmitted TBs; when the TBs with serial numbers of 4, 5 are currently transmitted by the network device, the network device is transmitting non-retransmitted TBs.

A terminal device transmits retransmitted TBs under two conditions: one condition is that all of or part of the time-frequency resource of a TB is occupied by another service, which causes part of the data in this TB has not been transmitted to the terminal device; the other condition is that the terminal device receives an HARQ feedback for a TB or a CBG in a TB from the terminal device.

In the embodiments of the present disclosure, the CBGs are classified into at least three types: a first type is a CBG that has been completely sent from a network device to a terminal device but has been falsely received by the terminal device; a second type is a CBG that has not been completely sent to a terminal device because the time-frequency resource of the CBG in a TB becomes occupied by another service during the process of sending the TB from a network device to the terminal device; a third type is a CBG that has been completely sent from a network device to a terminal device but has been correctly received by the terminal device. Wherein, for the above-mentioned three types of CBGs, the first and second types of CBGs need to be retransmitted, and if these two types of CBGs belong to the same TB, they can be retransmitted within the same retransmitted TB, that is to say, the retransmitted TB may contain both the first type of CBG and the second type of CBG. In an optional embodiment, the retransmitted TB may contain only one type of CBG selected from the first type of CBG and the second type of CBG.

Figure 2:
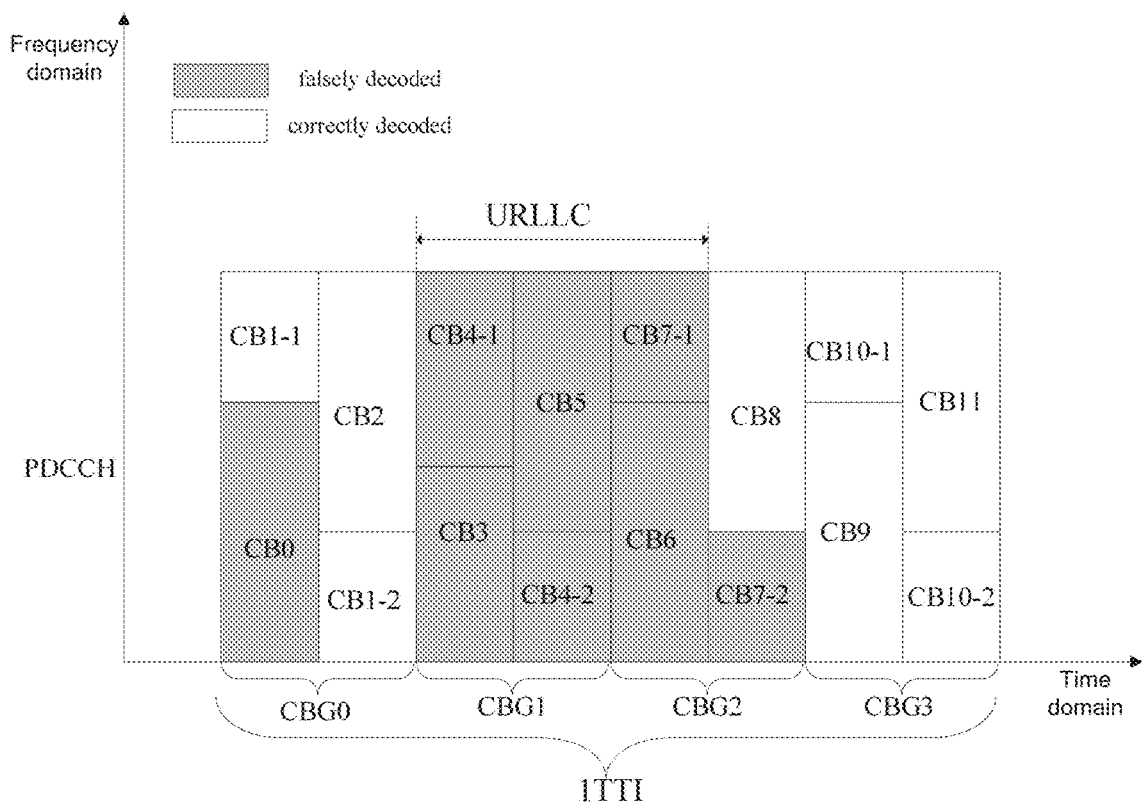
FIG. 2 is a schematic diagram of distribution of CBs and CBGs on time-frequency resource for one TB.

Hereinafter, examples are given to illustrate the three types of CBGs. Referring to FIG. 2, which is a schematic diagram of distribution of CBs and CBGs on time-frequency resource for one TB, as shown in the figure, a TB has 12 TBs, wherein CB0, CB1, CB2 belongs to CBG0, CB3, CB4, CB5 belongs to CBG1, CB6, CB7, CB8 belongs to CBG2, and CB9, CB10, CB11 belongs to CBG3. When transmitting the TB, the time-frequency resource of CB3, CB4, CB5, CB6 and part of the time-frequency resource of CB7 become occupied by URLLC service. After a terminal receives the TB, the terminal decodes every CB therein, and it is found that CB0, CB3, CB4, CB5, CB6 and CB7 are falsely decoded, wherein CB0 belongs to CBG0, CB3, CB4, CB5 belongs to CBG1, and CB6, CB7 belongs to CBG2. The CBGs that these falsely decoded CBs belong to need to be retransmitted, i.e. CBG0, CBG1 and CBG2 in this TB need to be retransmitted. Among these CBGs that need to be retransmitted, CBG0 is the first type of CBG, CBG1 and CBG2 are the second type of CBG. On the other hand, CBG3 is the third type of CBG.

It should be understood that, no matter when the network device transmits a TB, as long as the TB contains a type of CBG selected from the first type of CBG and the second type of CBG, this TB is called a retransmitted TB. For example, for the TB in FIG. 2, under the condition that the network device has not yet received an HARQ feedback from the terminal device, if the network device determines that CBG1 and CBG2 have not been completely sent to the terminal device because part of the time-frequency resource of CBG1 and CBG2 becomes occupied by URLLC service, the network device determines that CBG1 and CBG2 need to be retransmitted, therefore, CBG1 and CBG2 are put in TB1 to be sent to the terminal device, wherein TB1 is a retransmitted TB; under the condition that the network device has received an HARQ feedback from the terminal device, the network device determines that CBG0, CBG1 and CBG2 need to be retransmitted, therefore, CBG0, CBG1 and CBG2 are put in TB2 to be sent to the terminal device, wherein TB2 is a retransmitted TB; under the condition that the network device has not yet received an HARQ feedback from the terminal device, if the network device determines that CBG1 and CBG2 have not been completely sent to the terminal device because part of the time-frequency resource of CBG1 and CBG2 becomes occupied by URLLC service, the network device sends a preemption indication to the terminal device so as to inform the terminal device of which part of time-frequency resource is occupied by another service (or furthermore, the network device put CBG1 and CBG2 in TB1 to be sent to the terminal device, wherein TB1 is a retransmitted TB), so that the terminal device can correctly receive CBG1 and CBG2, and after the network device receives the HARQ feedback, the network device determines that only CBG0 needs to be further retransmitted according to the HARQ feedback, therefore, CBG0 is put in TB3 to be sent to the terminal device, wherein TB3 is a retransmitted TB.

When a network device communicates with a terminal device, corresponding time-frequency resource needs to be allocated to the terminal device. The network device may inform a user of corresponding resource information via Downlink Control Information (DCI). Because the service or data to be transmitted may be different, DCI information contained in a DCI signal can be different. In the embodiments of the present disclosure, the network device may sent the following four types of DCI information, as listed in Table 1, to the terminal device according to different circumstances.

TABLE 1

| DCI information | Whether a Code Block Group indicator is contained | Whether a Code Block Group decoding manner is contained |
|---|---|---|
| first DCI information | YES | YES |
| second DCI information | YES | NO |
| third DCI information | NO | YES |
| fourth DCI information | NO | NO |

Table 1 shows a possible scheme of DCI information, wherein, the first DCI information contains a Code Block Group indicator and a Code Block Group decoding manner; the second DCI information contains a Code Block Group indicator but does not contain a Code Block Group decoding manner; the third DCI information contains a Code Block Group decoding manner but does not contain a Code Block Group indicator; the fourth DCI information does not contain a Code Block Group indicator or a Code Block Group decoding manner. Herein, the Code Block Group indicator is for indicating which CBGs are contained in a TB corresponding to the DCI information, and the Code Block Group decoding manner is for indicating a decoding manner for the respective CBGs in a TB corresponding to the DCI information.

Wherein, the information domain sizes and formats for two pieces of DCI information may be designed as follows: the two pieces of DCI information have the same format and different information domain sizes; the two pieces of DCI information have the same format and the same information domain size; the two pieces of DCI information have different formats and the same information domain size; the two pieces of DCI information have different formats and different information domain sizes. For the above-mentioned four types of DCI information, there may be 1 to 4 kinds of formats and 1 to 4 kinds of information domain sizes, assuming the four kinds of formats are A, B, C, D and the four kinds of information domain sizes are a, b, c, d, the above-mentioned four types of DCI information may have a design scheme as shown in Table 2.

TABLE 2

| DCI information | (first DCI information, second DCI information, third DCI information, fourth DCI information) | |
| --- | --- | --- |
| One format, one information domain size | (Aa, Aa, Aa, Aa) | |
| One format, two information domain sizes (4 conditions) | (Aa, Aa, Aa, Ab) (Aa, Ab, Aa, Aa) | (Aa, Aa, Ab, Aa) (Ab, Aa, Aa, Aa) |
| One format, three information domain sizes (4 conditions) | (Aa, Aa, Ab, Ac) (Ab, Ac, Aa, Aa) | (Ab, Aa, Aa, Ac) (Aa, Ab, Ac, Aa) |
| One format, four information domain sizes | (Aa, Ab, Ac, Ad) | |
| Two formats, one information domain size (4 conditions) | (Aa, Aa, Aa, Ba) (Aa, Ba, Aa, Aa) | (Ba, Aa, Aa, Aa) (Aa, Aa, Ba, Aa) |
| Two formats, two information domain sizes (16 conditions) | (Aa, Aa, Aa, Bb) (Aa, Ab, Aa, Ba) (Aa, Aa, Ba, Ab) (Aa, Ab, Ba, Aa) (Aa, Ba, Aa, Ab) (Aa, Bb, Aa, Aa) (Ba, Aa, Aa, Ab) (Ba, Ab, Aa, Aa) | (Aa, Aa, Ab, Ba) (Ab, Aa, Aa, Ba) (Aa, Aa, Bb, Aa) (Ab, Aa, Ba, Aa) (Aa, Ba, Ab, Aa) (Ab, Ba, Aa, Aa) (Ba, Aa, Ab, Aa) (Bb, Aa, Aa, Aa) |
| Two formats, three information domain sizes (16 conditions) | (Aa, Aa, Bb, Bc) (Ab, Ac, Ba, Ba) (Ba, Aa, Ab, Bc) (Bb, Ac, Aa, Ba) (Ba, Ba, Ab, Ac) (Bb, Bc, Aa, Aa) (Aa, Ba, Bb, Ac) (Ab, Bc, Ba, Aa) | (Ab, Aa, Ba, Bc) (Aa, Ab, Bc, Ba) (Bb, Aa, Aa, Bc) (Ba, Ab, Ac, Ba) (Bb, Ba, Aa, Ac) (Ba, Bb, Ac, Aa) (Aa, Bb, Ba, Ac) (Aa, Bb, Bc, Aa) |
| Two formats, four information domain sizes (4 conditions) | (Aa, Ab, Ac, Bd) (Aa, Bb, Ac, Ad) | (Aa, Ab, Bc, Ad) (Ba, Ab, Ac, Ad) |
| Three formats, one information domain size (4 conditions) | (Ca, Aa, Aa, Ba) (Aa, Ba, Ca, Aa) | (Ba, Ca, Aa, Aa) (Aa, Aa, Ba, Ca) |
| Three formats, three information domain sizes (16 conditions) | (Aa, Aa, Bb, Cc) (Ab, Ac, Ba, Ca) (Ca, Aa, Ab, Bc) (Cb, Ac, Aa, Ba) (Ba, Ca, Ab, Ac) (Bb, Cc, Aa, Aa) (Aa, Ba, Cb, Ac) (Ab, Bc, Ca, Aa) | (Ab, Aa, Ba, Cc) (Aa, Ab, Bc, Ca) (Cb, Aa, Aa, Bc) (Ca, Ab, Ac, Ba) (Bb, Ca, Aa, Ac) (Ba, Cb, Ac, Aa) (Ab, Ba, Ca, Ac) (Aa, Bb, Cc, Aa) |
| Three formats, four information domain sizes (4 conditions) | (Aa, Ab, Bc, Cd) (Ba, Cb, Ac, Ad) | (Ca, Ab, Ac, Bd) (Aa, Bb, Cc, Ad) |
| Four formats, one information domain size | (Aa, Ba, Ca, Da) | |
| Four formats, two information domain sizes (4 conditions) | (Aa, Ba, Ca, Db) (Aa, Bb, Ca, Da) | (Aa, Ba, Cb, Da) (Ab, Ba, Ca, Da) |
| Four formats, three information domain sizes (4 conditions) | (Aa, Ba, Cb, Dc) (Ab, Bc, Ca, Da) (Aa, Bb, Cc, Dd) | (Ab, Ba, Ca, Dc) (Aa, Bb, Cc, Da) |

Table 2 shows possible combinations of the above-mentioned four types of DCI information, and in an optional embodiment, one combination selected from Table 2 can be used to design the types of DCI information.

The types of data or information involved in the embodiments of the present disclosure are introduced above, and hereinafter, a configuration method for sending and receiving data of the embodiments of the present disclosure will be described in detail.

Figure 3:
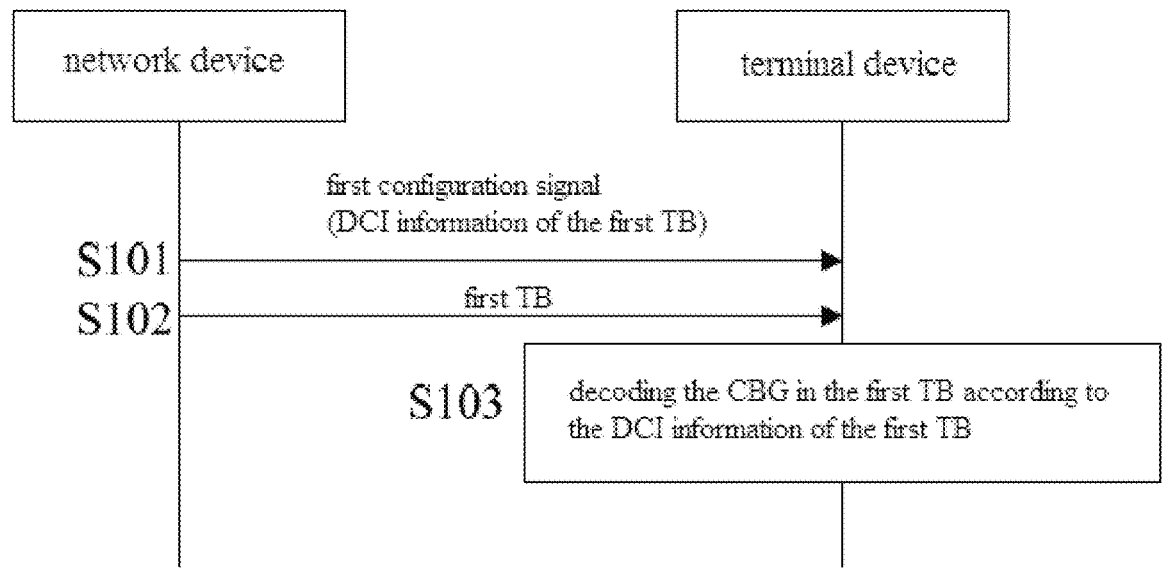
FIG. 3 is a flow chart of a configuration method for sending and receiving data provided by the embodiments of the present disclosure.

Referring to FIG. 3, which is a flow chart of a configuration method for sending and receiving data provided by the embodiments of the present disclosure, as shown in the figure, the method comprises:

Step S101, a network device sends a first configuration signal to a terminal device, and the terminal device receives the first configuration signal, wherein, the first configuration signal is for indicating whether a first TB is a retransmitted TB, and the first configuration signal contains DCI information of the first TB.

Wherein, the DCI information of the first TB contained in the first configuration signal may be the first DCI information, the second DCI information, the third DCI information, or the fourth DCI information.

Optionally, the terminal device selects different types of DCI information for the first TB according to specific scenarios.

In a first possible scenario, the first TB is not a retransmitted TB, then any one of the first DCI information, the second DCI information, the third DCI information and the fourth DCI information can be selected to be the DCI information in the first configuration signal.

In a second possible scenario, the first TB is a retransmitted TB, under the condition that the first TB does not contain a second retransmitted CBG which has the same location as a second CBG, then any one of the first DCI information, the second DCI information, the third DCI information and the fourth DCI information can be selected to be the DCI information in the first configuration signal. Wherein, the second CBG is a CBG in a second TB which has the same HARQ process number as that of the first TB, the second TB is transmitted to the terminal device before the network device sends the first TB, and the second CBG is the second type of CBG as mentioned above. Wherein, the second retransmitted CBG is retransmission of the second CBG, the serial number/identity of the CBs contained in the second retransmitted CBG is the same as that of the corresponding CBs contained in the second CBG, and the CBG identity/CBG serial number of the second retransmitted CBG is the same as that of the second CBG. Herein, the CBG identity/CBG serial number uniquely identifies one CBG in a TB.

An example is given below for illustrating a mapping relation between the first TB and the second TB, as well as a mapping relation between the second retransmitted CBG and the second CBG.

Figure 4:
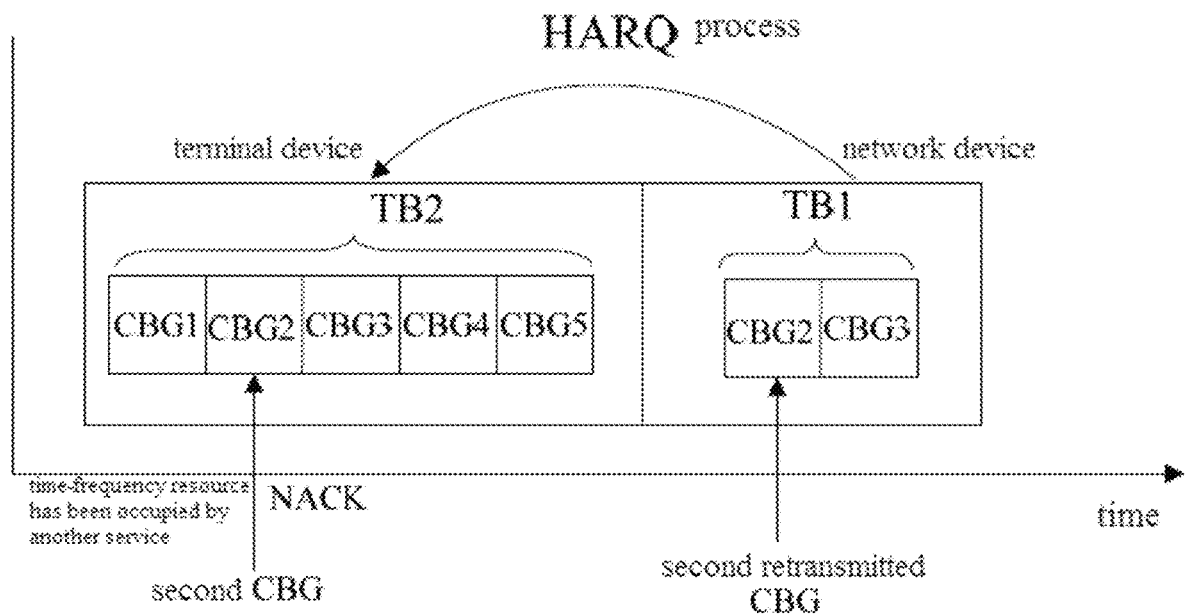
FIG. 4 is a schematic diagram of a relation between TBs in the same HARQ process.

For example, as shown in FIG. 4, TB1 and TB2 are in the same HARQ process, wherein, TB1 has not yet been transmitted to the terminal device, i.e. TB1 is the first TB; TB2 has already been transmitted to the terminal device, i.e. TB2 is the second TB. The CBGs contained in TB2 are CBG1, CBG2, CBG3, CBG4, CBG5, and the CBGs contained in TB1 are CBG2, CBG3. If CBG2 in TB2 is falsely received at the terminal device because its time-frequency resource becomes occupied by another service, the CBG2 in TB2 is the second CBG, wherein, the CBG serial number of CBG2 in TB1 is the same as that of the CBG2 in TB2, and the CBG2 in TB1 is the second retransmitted CBG.

In a third possible scenario, the first TB is a retransmitted TB, under the condition that the first TB contains a second retransmitted CBG which has the same location as the second CBG and that the network device has sent a preemption indication to the terminal device, then any one of the first DCI information, the second DCI information, the third DCI information and the fourth DCI information can be selected to be the DCI information in the first configuration signal.

In a fourth possible scenario, the first TB is a retransmitted TB, under the condition that the first Transport Block contains a second retransmitted Code Block Group which has the same location as the second Code Block Group and that no preemption indication has been sent to the terminal device, then either of the first DCI information and the third DCI information can be selected to be the DCI information in the first configuration signal.

Step S102, the network device sends the first TB to the terminal device, and the terminal device receives the first TB.

Wherein, the first TB may be a retransmitted TB or a non-retransmitted TB. The retransmitted TB and non-retransmitted TB have been introduced in the above embodiments, which are not repeatedly explained herein.

Optionally, before the network device sends the first configuration signal to the terminal device, the network device sends a preemption indication to the terminal device, wherein, the preemption indication is for indicating part of or all of the time-frequency resource in the second TB that corresponds to the second CBG. Wherein, the network device sends the preemption indication to the terminal device to let the terminal device know which part of time-frequency resource would be occupied by another service in the process of receiving the second TB, and the terminal device can then determine the CBG in the second TB that correspond to the time-frequency resource occupied by another service is the second CBG.

Step S103, the terminal device decodes the CBGs in the first TB according to the DCI information of the first TB.

If the first TB is a non-retransmitted TB, there would be no other corresponding TB in the HARQ process of the first TB, therefore, the terminal device only decodes the respective CBGs in the first TB in sequence. If the first TB is a retransmitted TB, there would be another corresponding TB in the HARQ process of the first TB, therefore, the terminal device needs to determine whether the CBGs in the first TB are a first retransmitted CBG or a second retransmitted CBG, so as to determine the decoding manner for the respective CBGs in the first TB.

Optionally, if the first TB is a retransmitted TB, the terminal device determines the CBG contained in the first TB according to the DCI information of the first TB, and determines a first target CBG in the first TB to be a first retransmitted CBG or a second retransmitted CBG according to the DCI information of the first TB. Wherein, the first retransmitted CBG is retransmission of the first type of CBG as mentioned above, and the second retransmitted CBG is retransmission of the second type of CBG as mentioned above.

Optionally, if the first target CBG is determined to be the first retransmitted CBG, the terminal device performs combined decoding for the first target CBG with a first CBG in the second TB; if the first target CBG is determined to be the second retransmitted CBG, the terminal device deletes a second CBG in the second TB and decodes the second retransmitted CBG. Wherein, the second TB has the same HARQ process number as that of the first TB, the first CBG is the first type of CBG as mentioned above, the serial number/identity of the CBs contained in the first retransmitted CBG is the same as that of the corresponding CBs contained in the first CBG, and the CBG identity/CBG serial number of the first retransmitted CBG is the same as that of the first CBG; the relationship between the second CBG and the second retransmitted CBG has been described in the above-mentioned Step S101, which is not repeatedly described herein.

Figure 5:
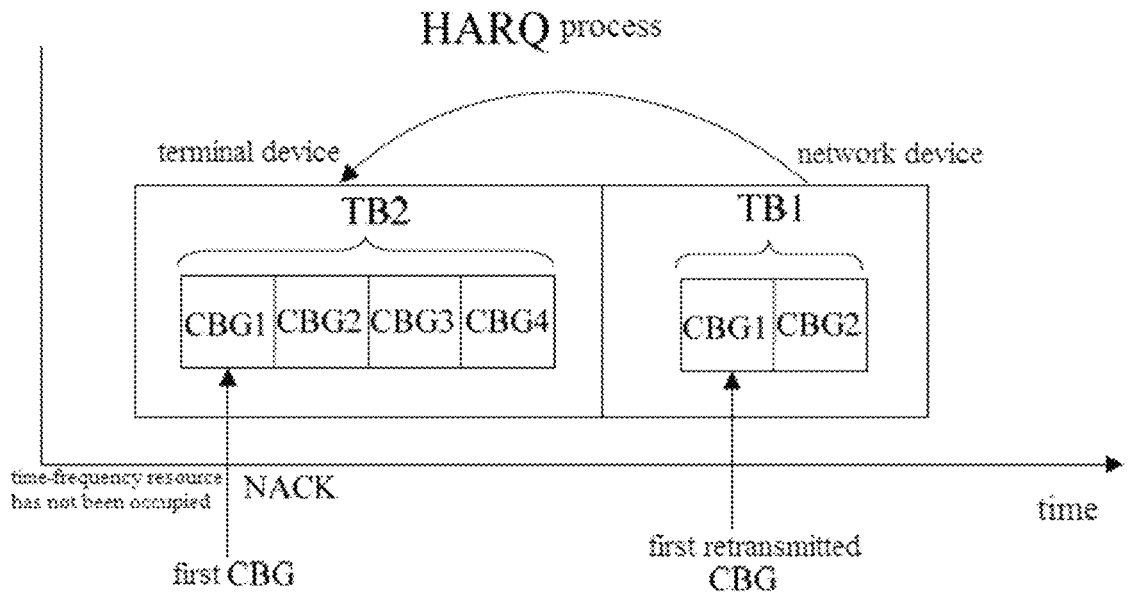
FIG. 5 is a schematic diagram of another relation between TBs in the same HARQ process.

An example is given below for illustrating a mapping relation between the first CBG and the first retransmitted CBG. For example, as shown in FIG. 5, TB1 is retransmission of TB2, the CBGs contained in TB2 are CBG1, CBG2, CBG3, CBG4, and the CBGs contained in TB1 are CBG1, CBG2. If CBG1 in TB2 is falsely received at the terminal device under the condition that its time-frequency resource is never occupied by another service, the CBG1 in TB2 is the first CBG, wherein, the CBG serial number of CBG1 in TB1 is the same as that of the CBG1 in TB2, and the CBG1 in TB1 is the first retransmitted CBG.

Several scenarios of determining the CBG contained in the first TB and determining whether a first target CBG in the first TB is a first retransmitted CBG or a second retransmitted CBG are illustrated below.

In a possible scenario, the DCI information for the first TB is the third DCI information or the fourth DCI information, the terminal device determines the CBG contained in the first TB according to a location of the second target CBG in the second TB. Wherein, the second target CBG is a CBG which is falsely received in the second TB, and the second target CBG may be either of the first type of CBG and second type of CBG as mentioned above. For example, TB1 is retransmission of TB2, the CBGs contained in TB2 are CBG1, CBG2, CBG3, CBG4, and it is assumed that CBG1 and CBG2 of TB2 have been falsely received, when the terminal device receives the DCI information for TB1 which is the third DCI information or the fourth DCI information, the terminal device determines the CBGs contained in TB1 to be CBG1 and CBG2.

In another possible scenario, the DCI information for the first TB is the first DCI information or the second DCI information, the terminal device determines the CBG contained in the first TB according to the CBG indicator in the first DCI information or the second DCI information. For example, TB1 is retransmission of TB2, the CBGs contained in TB2 are CBG1, CBG2, CBG3, CBG4, when the terminal device receives the DCI information for TB1 which is the first DCI information or the second DCI information, the terminal device can determine the CBG contained in TB1 according to the CBG indicator in the first DCI information or the second DCI information. Assuming that an information domain carrying this CBG indicator indicates that the CBGs contained in TB1 is CBG1 and CBG3, the terminal device can then determine the CBGs contained in TB1 to be CBG1 and CBG3.

In a possible scenario, the DCI information for the first TB is the second DCI information or the fourth DCI information, and under the condition that the terminal device receives no preemption indication, the terminal device determines all CBGs in the first TB to be the first retransmitted CBG. For example, TB1 is retransmission of TB2, the CBGs contained in TB2 are CBG1, CBG2, CBG3, CBG4, the CBGs contained in TB1 are CBG1, CBG2, when the terminal device receives the DCI information for the first TB which is the second DCI information or the fourth DCI information, and the terminal device receives no preemption indication before receiving TB1, the terminal device then determines CBG1, CBG2 in TB1 to be the first type of CBG as mentioned above.

In another possible scenario, the DCI information for the first TB is the second DCI information or the fourth DCI information, and under the condition that the terminal device receives a preemption indication, the terminal device determines a location of the second CBG in the second TB according to the preemption indication, and then determines the CBG having the same location in the first TB as that of the second CBG in the second TB to be the second retransmitted CBG and determines the remaining CBG in the first TB to be the first retransmitted CBG, wherein the remaining CBG refers to the CBG that remains after the second retransmitted CBG is eliminated from the first TB. For example, TB1 is retransmission of TB2, the CBGs contained in TB2 are CBG1, CBG2, CBG3, CBG4, the CBGs contained in TB1 are CBG1, CBG2, CBG3, when the terminal device receives the DCI information for the first TB which is the second DCI information or the fourth DCI information, and the network device has sent a preemption indication to the terminal device before sending TB1, while the preemption indication indicates that the time-frequency resource of CBG1, CBG2 in TB2 would be occupied by another service, the terminal device then determines CBG1, CBG2 in TB1 to be the second type of CBG as mentioned above, i.e. the second retransmitted CBG, and then determines CBG3 in TB1 to be the first retransmitted CBG.

In another possible scenario, the DCI information for the first TB is the first DCI information or the third DCI information, the terminal device determines the target CBG in the first TB to be the first retransmitted CBG or the second retransmitted CBG according to the CBG decoding manner in the first DCI information or the third DCI information. For example, TB1 is retransmission of TB2, the CBGs contained in TB2 are CBG1, CBG2, CBG3, CBG4, the CBGs contained in TB1 are CBG1, CBG2, CBG4, when the terminal device receives the DCI information for the first TB which is the first DCI information or the third DCI information, the terminal device determines the decoding manner for the respective CBGs in TB1. Assuming that an information domain carrying this CBG decoding manner indicates that the decoding manner for CBG2 in TB1 is deleting and decoding, the terminal device determines CBG1, CBG4 in TB1 to be the first retransmitted CBG, and determines CBG2 in TB1 to be the second retransmitted CBG.

Optionally, before the terminal device decodes the CBGs in the first TB according to the DCI information of the first TB, the method further comprises that the terminal device determines whether the DCI information of the first TB contains a CBG indicator and/or a CBG decoding manner, in other words, the terminal device determines the DCI information of the first TB to be which one or ones selected from the first DCI information, the second DCI information, the third DCI information and the fourth DCI information, so as to determine what kind or kinds of DCI formats and information domain sizes should be tried one by one in the process of detecting whether a desired DCI information exists in PDCCH.

In a possible example, the terminal device seeks to decode a desired DCI information according to the information domain size of DCI information and/or the DCI format that might be used by the first TB, so as to determine whether the DCI information of the first TB contains a CBG indicator and/or a CBG decoding manner.

For example, the design scheme of the first DCI information, the second DCI information, the third DCI information and the fourth DCI information is "One format, four information domain sizes" as listed in Table 2 above, the terminal device can determine which kind of information domain size that this one format adopts according to whether a preset indicator bit exists in the DCI information of the first TB in the acquired RRC indication signal, and if the terminal device determines that both the indicator bit of "CBG indicator" and the indicator bit of "CBG decoding manner" exist in this DCI information, the terminal device then determines that the DCI information of the first TB is the first DCI information, and further determines that the DCI information of the first TB contains a CBG indicator and a CBG decoding manner and determines that the information domain size of the DCI information of the first TB is a, the terminal device then would detect each DCI information according to the information domain size of a, so as to decode a desired DCI information.

For another example, the design scheme of the first DCI information, the second DCI information, the third DCI information and the fourth DCI information is "Four formats, one information domain size" as listed in Table 2 above, the terminal device can seek to acquire a desired DCI information according to this one information domain size, and then get to know which format this DCI information is in according to the format indicator bit, and if, according to the format indicator bit, the DCI format is determined to be B and the DCI information of the first TB as acquired is determined to be the second DCI information accordingly, it can be then determined that the DCI information of the first TB contains a CBG indicator but does not contain a CBG decoding manner.

For another example, the design scheme of the first DCI information, the second DCI information, the third DCI information and the fourth DCI information is (Aa, Aa, Aa, Bb) from "Two formats, two information domain sizes" as listed in Table 2 above, the terminal device needs to seek to acquire a desired DCI information according to these two information domain sizes, and if a DCI information is successfully decoded in the information domain size of b and the DCI information of the first TB as acquired is determined to be the fourth DCI information accordingly, it can be then determined that the DCI information of the first TB does not contain a Code Block Group indicator or a Code Block Group decoding manner.

In a possible example, the terminal device only needs to receive one format and one information domain size because the DCI information of the first TB always contains a CBG indicator and a CBG decoding manner.

For example, the design scheme of the first DCI information, the second DCI information, the third DCI information and the fourth DCI information is "One format, one information domain size" as listed in Table 2 above, the terminal device can seek to acquire a desired DCI information according to this one information domain size, and since the DCI format always contains a CBG indicator and a CBG decoding manner, the terminal device can get to know which CBGs the TB contains as well as the decoding manner of each CBG.

In another possible example, the terminal device seeks to decode a desired DCI information according to the information domain size of DCI information and/or the DCI format that might be used by the first TB in combination with whether a preset indicator bit exists, so as to determine whether the DCI information of the first TB contains a CBG indicator and/or a CBG decoding manner.

For example, the design scheme of the first DCI information, the second DCI information, the third DCI information and the fourth DCI information is (Aa, Ab, Ab, Bc) from "Two formats, three information domain sizes" as listed in Table 2 above, the terminal device can determine whether the DCI information of the first TB contains a CBG indicator and/or a CBG decoding manner according to whether a preset indicator bit exists in the DCI information of the first TB in the acquired RRC indication signal, and if the terminal device determines that the indicator bit of "CBG indicator" exists in the acquired RRC indication signal and that the indicator bit of "CBG decoding manner" does not exist therein, then the DCI format is A and the information domain size is b, meaning this DCI information is the second DCI information, therefore, the terminal device only needs to seek to decode whether a DCI information in format A as desired exists according to the information domain size of b, so as to get to know which CBGs are contained in the TB.

In another possible example, the terminal device determines whether the DCI information that might be used by the first TB contains a CBG indicator and/or a CBG decoding manner according to the signal carrier that the first TB is on.

For example, the network device may configure different DCI information for respective signal carriers, it is assumed that the network device configures the DCI information for a first signal carrier to be the first DCI information and that the first TB is transmitted on the first signal carrier, the terminal device can then determine the DCI information of the first TB is the first DCI information and further determines the DCI information of the first TB contains both a CBG indicator and a CBG decoding manner, and the terminal device then would seek to detect whether the first signal carrier carries a desired DCI information according to the information domain size of the first DCI information.

In another possible example, the terminal device determines whether the DCI information of the first TB contains a CBG indicator and/or a CBG decoding manner according to the signal carrier that the first TB is on in combination with the information domain size of DCI information and/or the DCI format that might be used by the first TB For example, the network device configures the DCI information for a first signal carrier to be the first DCI information and the fourth DCI information, the first TB is transmitted on the first signal carrier, the terminal device can then determine the DCI information of the first TB is the first DCI information or the fourth DCI information, the terminal device thus would need to seek to detect whether the first signal carrier carries a desired first or fourth DCI information according to the information domain size of the first DCI information and the fourth DCI information. The particular manner can refer to the example of determining whether the DCI information of the first TB contains a CBG indicator and/or a CBG decoding manner according to the information domain size of DCI information and/or the DCI format of the first TB, which is not repeatedly illustrated herein.

In another possible example, the terminal device determines whether the DCI information of the first TB contains a CBG indicator and/or a CBG decoding manner according to the signal carrier that the first TB is on in combination with whether a preset indicator bit exists.

In the embodiments of the present disclosure, the network device can send different types of DCI information to the terminal device according to different communication scenarios, so as to clearly indicate which CBGs and what types of CBGs are sent by the network device, the terminal device can seek to decode a desired DCI information according to the configured one or more DCI information domain sizes and one or more DCI formats, and thus determine which CBGs the first TB contains as well as the decoding manner for the respective CBGs in the first TB according to the acquired DCI information, so that the CBGs can be received with a greater correct rate, unnecessary retransmission can be avoided, and in the meantime, the retransmission based on units of CBGs can avoid the occurrence of excessive retransmission.

Figure 6:
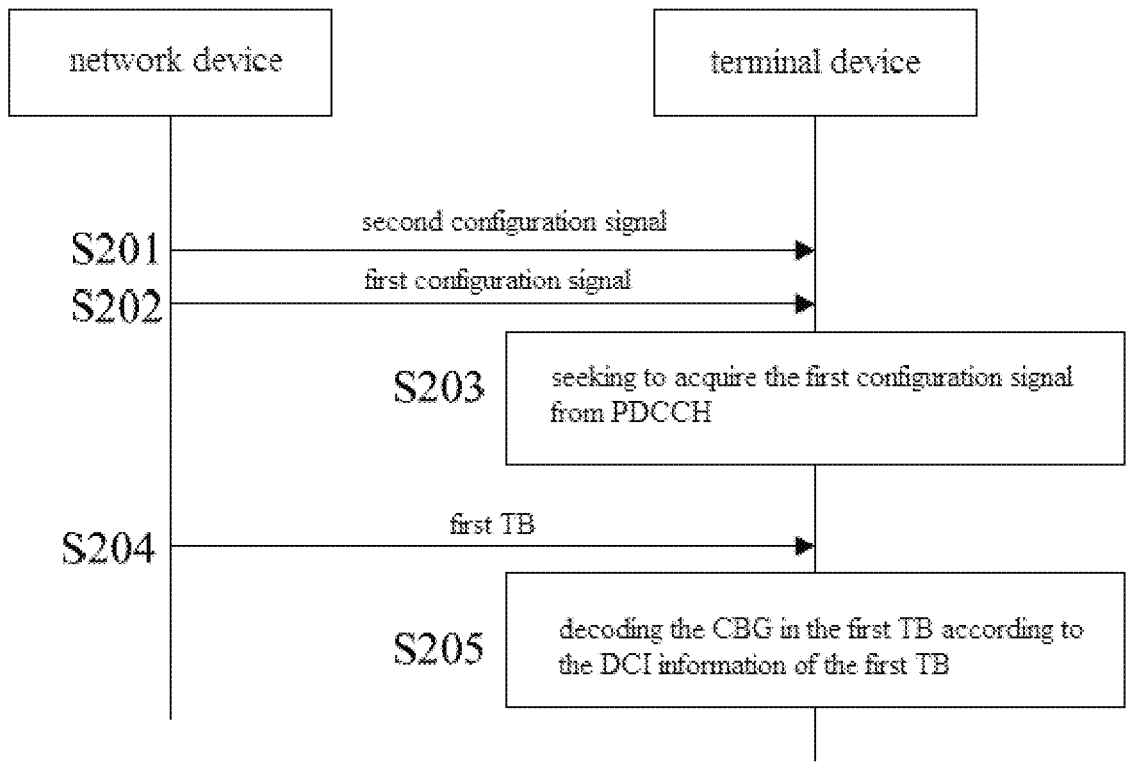
FIG. 6 is a flow chart of another configuration method for sending and receiving data provided by the embodiments of the present disclosure.

In the above-mentioned embodiments, the terminal device needs to go through blind detection to get the first configuration signal and the DCI information of the first TB, wherein, the DCI information of the first TB that is sent from the network device to the terminal device may be the first DCI information, the second DCI information, the third DCI information or the fourth DCI information. Under the condition of not knowing which type of DCI information of the first TB the network device sends, the terminal device needs to test and verify the four types of DCI information respectively, i.e. seeks to perform decoding according to the information domain sizes and formats of four types of DCI information one by one, so as to finally determine which type of DCI information the DCI information of the first TB is. In a possible example, the network device sends an indication to the terminal device so as to instruct which type or types of information the terminal device should detect. Referring to FIG. 6, which is a flow chart of another configuration method for sending and receiving data provided by the embodiments of the present disclosure, as shown in the figure, the method comprises:

Step S201, the network device sends a second configuration signal to the terminal device, and the terminal device receives the second configuration signal, wherein, the second configuration signal is for instructing the terminal device to detect at least one of the first DCI information, the second DCI information, the third DCI information and the fourth DCI information.

Wherein, the second configuration signal may be RRC signal, or may be MAC signal.

The second configuration signal is also for indicating the DCI information that the terminal device needs to detect on at least one target signal carrier, wherein, the first TB is transmitted on one of the at least one target signal carrier.

For example, the network device uses a first signal carrier and a second signal carrier for transmitting data to the terminal device, then the second configuration signal may instruct the DCI information that the terminal device needs to detect on the first signal carrier is the first DCI information and the second DCI information while the DCI information that the terminal device needs to detect on the second signal carrier is the third DCI information and the fourth DCI information. In a possible example, the second configuration signal contains a carrier indicator and a corresponding DCI information indicator, in order to instruct the terminal device to detect the corresponding DCI information when receiving a TB on a signal carrier corresponding to the carrier indicator.

In an optional embodiment, the second configuration signal may provide individual indications for the DCI information on each individual target signal carrier of the at least one target signal carrier, or may provide a unified indication for the DCI information on the at least one target signal carrier. Wherein, when the TBs carried by multiple signal carriers are from the same service, the second configuration signal provides a unified indication for the DCI information on the multiple target signal carriers; when the TBs carried by multiple signal carriers are not from the same service, the second configuration signal provides individual indications for the DCI information on each individual target signal carrier of the multiple target signal carriers. For example, when the network device is currently transmitting data to the terminal device via three signal carriers, namely, signal carrier-1, signal carrier-2 and signal carrier-3, if the TBs on signal carrier-1, signal carrier-2 and signal carrier-3 all belong to enhanced Mobile BroardBand (eMBB) service data, the second configuration signal can provide a unified indication which indicates that the DCI information on all these three signal carriers are the first DCI information and the second DCI information, in particular, the second configuration signal may contain indicators corresponding to the first DCI information and the second DCI information, so that the terminal device can determine the DCI information on all these three signal carriers are the first DCI information and the second DCI information after receiving the second configuration signal; if the TBs on signal carrier-1, signal carrier-2 belong to eMBB service data and the TBs on signal carrier-3 belong to Ultra Reliable Low Latency Communications (URLLC) service data, the DCI information on these three signal carriers would need to be individually indicated, it is assumed that the eMBB service uses the first DCI information and the third DCI information and that the URLLC service uses the first DCI information and the fourth DCI information, the second configuration signal may contain indicators of the first DCI information and the third DCI information that have been correlated with the carrier indicators of signal carrier-1 and signal carrier-2, and in the meantime, the second configuration signal may contain indicators of the first DCI information and the fourth DCI information that have been correlated with the carrier indicator of signal carrier-3, so that, after the terminal device receives the second configuration signal, the terminal device can determine the DCI information on signal carrier-1 and signal carrier-2 is the first DCI information and the third DCI information according to the carrier indicators of signal carrier-1 and signal carrier-2 correlated with the indicators of the first DCI information and the third DCI information, and determine the DCI information on signal carrier-3 is the first DCI information and the fourth DCI information according to the carrier indicator of signal carrier-3 correlated with the indicators of the first DCI information and the fourth DCI information.

Step S202, the network device sends a first configuration signal to the terminal device, wherein, the first configuration signal contains DCI information of the first TB. Wherein, the Step S202 is the same as the Step S101 in the embodiment corresponding to FIG. 3, and its details can refer to the related description of the Step S101, which is not repeated described herein.

Step S203, the terminal device seeks to acquire the first configuration signal from PDCCH information according to at least one preset information domain size of DCI information and at least one preset DCI format.

Optionally, the terminal device determines the type of the DCI information configured for a first TB by the network device according to the second configuration signal, and then tests and verifies DCI information with a corresponding format and a corresponding information domain size in PDCCH information according to the information domain size of DCI information and the DCI format associated with this type, and if the verification turns out to be correct, the first configuration signal containing this DCI information can be acquired.

In a possible scenario, the second configuration signal indicates only one type of DCI information, the terminal device may then acquire the first configuration signal from PDCCH information according to one format and one information domain size.

In a possible scenario, the second configuration signal indicates two types of DCI information, the terminal device may then acquire the first configuration signal from PDCCH information according to two formats and one information domain size, or according to two formats and two information domain sizes.

In a possible scenario, the second configuration signal indicates three types of DCI information, the terminal device may then acquire the first configuration signal from PDCCH information according to three formats and one information domain size, or according to three formats and two information domain sizes, or according to three formats and three information domain sizes.

In a possible scenario, the second configuration signal indicates four types of DCI information, the terminal device may then acquire the first configuration signal from PDCCH information according to four formats and one information domain size, or according to four formats and two information domain sizes, or according to four formats and three information domain sizes, or according to four formats and four information domain sizes.

Step S204, the network device sends the first TB to the terminal device, and the terminal device receives the first TB.

Step S205, the terminal device decodes the CBGs in the first TB according to the DCI information of the first TB.

Wherein, the Steps S204 to S205 is the same as the Steps S102 to S103, and their details can refer to the related description of the Steps S102 to S103, which is not repeated described herein.

In the embodiments of the present disclosure, the network device sends a second configuration signal to the terminal device before sending the first configuration signal, wherein the second configuration signal is for instructing the terminal device to detect at least one of the first DCI information, the second DCI information, the third DCI information and the fourth DCI information. Because the second configuration signal clearly instructs the terminal device to which type of types of DCI information, the signaling overhead can be saved, and meanwhile the times of user blind detection can be reduced, thereby increasing the data reception efficiency for the terminal device.

The method of the embodiments of the present disclosure has been illustrated above in detail, and hereinafter, the apparatus of the embodiments of the present disclosure is provided.

Figure 7:
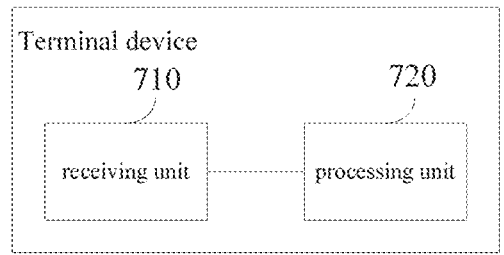
FIG. 7 is a schematic diagram of component structure of a terminal device provided by the embodiments of the present disclosure.

Referring to FIG. 7, which is a schematic diagram of component structure of a terminal device provided by the embodiments of the present disclosure, as shown in the figure, the terminal device comprises:

A receiving unit 710, for receiving a first configuration signal sent by a network device, wherein, the first configuration signal is for indicating whether a first Transport Block to be sent by the network device is a retransmitted Transport Block, and the first configuration signal contains DCI information of the first Transport Block; The receiving unit 710 is also for receiving the first Transport Block sent by the network device, wherein, the first Transport Block comprises at least one Code Block Group;

A processing unit 720, for decoding the Code Block Group in the first Transport Block according to the first configuration signal Optionally, if the first Transport Block is a retransmitted Transport Block, the processing unit 720 is also for determining the Code Block Group contained in the first Transport Block according to the DCI information of the first Transport Block.

Optionally, the processing unit 720 is particularly for, if the DCI information of the first Transport Block does not contain a Code Block Group indicator, determining the Code Block Group contained in the first Transport Block according to a location of a second target Code Block Group in a second Transport Block, wherein, the second target Code Block Group is a Code Block Group which is falsely received in the second Transport Block, the second Transport Block is a received Transport Block with the same HARQ process number as that of the first Transport Block.

Optionally, the receiving unit 710 is also for receiving a preemption indication sent by the network device, wherein, the preemption indication is for indicating part of or all of the time-frequency resource in the second Transport Block that corresponds to a second Code Block Group, wherein, part of or all of the time-frequency resource of the second Code Block Group is occupied by Code Block Groups sent to another terminal device through the network device.

Optionally, the processing unit 720 is particularly for, if the DCI information of the first Transport Block does not contain a Code Block Group indicator, determining that the Code Block Group contained in the first Transport Block is the second Code Block Group.

Optionally, the processing unit 720 is particularly for, if the DCI information of the first Transport Block contains a Code Block Group indicator, determining the Code Block Group contained in the first Transport Block according to the Code Block Group indicator in the DCI information of the first Transport Block.

Optionally, the processing unit 720 is for determining a first target Code Block Group in the first Transport Block to be a first retransmitted Code Block Group or a second retransmitted Code Block Group according to the DCI information of the first Transport Block;
if the first target Code Block Group is determined to be the first retransmitted Code Block Group, performing combined decoding for the first target Code Block Group with a first Code Block Group, wherein, the first Code Block Group is a Code Block Group having the same location in a second Transport Block as the first target Code Block Group in the first Transport Block, the second Transport Block is a received Transport Block with the same HARQ process number as that of the first Transport Block;
if the first target Code Block Group is determined to be the second retransmitted Code Block Group, deleting a second Code Block Group and decoding the second retransmitted Code Block Group, wherein, the second Code Block Group is a Code Block Group having the same location in the second Transport Block as the second retransmitted Code Block Group in the first Transport Block.

Optionally, the receiving unit 710 is also for receiving a preemption indication sent by the network device, wherein, the preemption indication is for indicating part of or all of the time-frequency resource in the second Transport Block that corresponds to the second Code Block Group, wherein, part of or all of the time-frequency resource of the second Code Block Group is occupied by Code Block Groups sent to another terminal device through the network device.

Optionally, the processing unit 720 is particularly for, if the DCI information of the first Transport Block does not contain a Code Block Group decoding manner, determining that the Code Block Group having the same location as that of the second Code Block Group is the second retransmitted Code Block Group.

Optionally, the processing unit 720 is particularly for, if the DCI information of the first Transport Block contains a Code Block Group decoding manner, determining the first target Code Block Group in the first Transport Block to be the first retransmitted Code Block Group or the second retransmitted Code Block Group according to the Code Block Group decoding manner in the DCI information of the first Transport Block.

Optionally, the processing unit 720 is particularly for, if the DCI information of the first Transport Block does not contain a Code Block Group decoding manner and there is no preemption indication received, determining all Code Block Groups in the first Transport Block to be the first retransmitted Code Block Group.

Optionally, the processing unit 720 is also for determining whether the DCI information of the first Transport Block contains a Code Block Group indicator and/or a Code Block Group decoding manner according to an information domain size and/or a DCI format of the DCI information of the first Transport Block.

Optionally, the processing unit 720 is also for determining whether the DCI information of the first Transport Block contains a Code Block Group indicator and/or a Code Block Group decoding manner according to whether a preset indicator bit exists in the DCI information of the first Transport Block.

Optionally, the processing unit 720 is also for determining whether the DCI information of the first Transport Block contains a Code Block Group indicator and/or a Code Block Group decoding manner according to the signal carrier that the first Transport Block is on.

Optionally, the receiving unit 710 is particularly for seeking to acquire the first configuration signal that contains the DCI information of the first Transport Block from PDCCH information according to at least one preset information domain size of DCI information and at least one preset DCI format.

Optionally, the receiving unit 710 is also for receiving a second configuration signal sent by the network device, wherein, the second configuration signal is for instructing to detect one or more of the following four types of DCI information:
- a first DCI information which contains a Code Block Group indicator and a Code Block Group decoding manner;
- a second DCI information which contains a Code Block Group indicator and does not contain a Code Block Group decoding manner;
- a third DCI information which contains a Code Block Group decoding manner and does not contain a Code Block Group indicator;
- a fourth DCI information which does not contain a Code Block Group indicator or a Code Block Group decoding manner.

Optionally, the receiving unit 710 is particularly for seeking to acquire the first configuration signal that contains the DCI information of the first Transport Block from PDCCH information according to the second configuration signal in combination with the at least one preset information domain size of DCI information and at least one preset DCI format.

Optionally, the at least one preset information domain size of DCI information and at least one preset DCI format comprises: one type of information domain size of DCI information and at least two different types of DCI formats; or at least two different types of information domain sizes of DCI information and one type of DCI format; or at least two different types of information domain sizes of DCI information and at least two different types of DCI formats.

It should be noted that, the implementation of the respective units can also refer to the corresponding description of the terminal device in the method embodiments shown in FIG. 3 or FIG. 6.

In the terminal device of FIG. 7, the terminal device decodes the CBGs in the first TB according to the first configuration signal, so as to increase the reception correct rate and avoid unnecessary retransmission.

Figure 8:
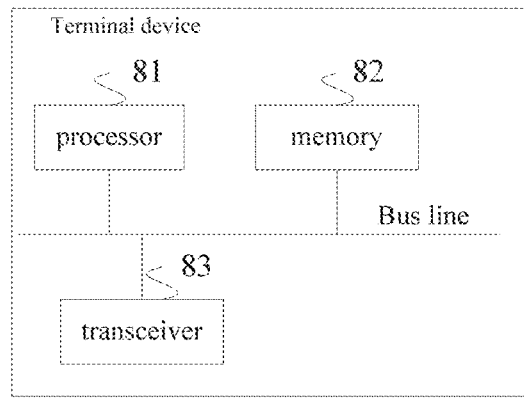
FIG. 8 is a schematic diagram of component structure of another terminal device provided by the embodiments of the present disclosure.

Referring to FIG. 8, which is a schematic diagram of component structure of another terminal device provided by the embodiments of the present disclosure, as shown in the figure, the terminal device comprises a processor 81, a memory 82 and a transceiver 83. The processor 81 is connected to the memory 82 and the transceiver 83, for example, the processor 81 is connected to the memory 82 and the transceiver 83 through a bus line.

The processor 81 is configured to support the terminal device to execute corresponding functions in the configuration method for sending and receiving data as shown in FIG. 3 or FIG. 6. The processor 81 may be a Central Processing Unit (CPU), a Network Processor (NP), a hardware chip, or a combination thereof. The aforementioned hardware chip may be an Application-Specific Integrated Circuit (ASIC), a Programmable Logic Device (PLD), or a combination thereof. The aforementioned PLD may be a Complex Programmable Logic Device (CPLD), a Field-Programmable Gate Array (FPGA), a Generic Array Logic (GAL), or a combination thereof.

The memory 82 is for storing program codes, etc. The memory 82 may comprise a Volatile Memory such as a Random Access Memory (RAM); the memory 82 may also comprise a Non-Volatile Memory such as a Read-Only Memory (ROM), a Flash Memory, a Hard Disk Drive (HDD) or a Solid-State Drive (SSD); the memory 82 may also comprise a combination of the aforementioned types of memory.

The transceiver 83 is for transmitting data.

The processor 81 can calls the program codes to execute the following operations:
receiving a first configuration signal sent from a network device via the transceiver 83, wherein, the first configuration signal is for indicating whether a first Transport Block to be sent by the network device is a retransmitted Transport Block, and the first configuration signal contains DCI information of the first Transport Block;
receiving the first Transport Block sent from the network device via the transceiver 83, wherein, the first Transport Block comprises at least one Code Block Group;
decoding the Code Block Group in the first Transport Block by a terminal device according to the DCI information of the first Transport Block.

It should be noted that, The processor 81 can also execute the operations corresponding to the described terminal device in the method shown in FIG. 3 or FIG. 6.

The embodiments of the present disclosure also provide a computer storage medium with a computer program stored therein, the computer program comprises program instructions that, when executed by a computer, causes the computer to execute the method of the aforementioned embodiments, wherein the computer may be a part of the terminal device mentioned above.

Figure 9:
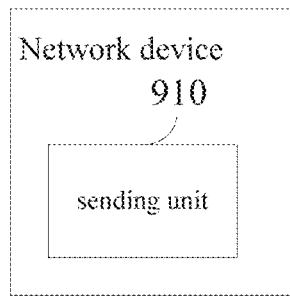
FIG. 9 is a schematic diagram of component structure of a network device provided by the embodiments of the present disclosure.

Referring to FIG. 9, which is a schematic diagram of component structure of a network device provided by the embodiments of the present disclosure, as shown in the figure, the network device comprises:
a sending unit 910, for sending a first configuration signal to a terminal device, wherein, the first configuration signal is for indicating whether a first Transport Block is a retransmitted Transport Block, and the first configuration signal contains DCI information of the first Transport Block;
the sending unit 910 is also for sending the first Transport Block to the terminal device, wherein, the first Transport Block comprises at least one Code Block Group.

Optionally, the sending unit 910 is also for sending a preemption indication to the terminal device, wherein, the preemption indication is for indicating part of or all of the time-frequency resource in a second Transport Block that corresponds to a second Code Block Group,
wherein, the second Transport Block is a Code Block Group already sent to the terminal device and having the same HARQ process number as that of the first Transport Block, part of or all of the time-frequency resource corresponding to the second Code Block Group is occupied by Code Block Groups sent to another terminal device.

Optionally, the sending unit 910 is also for sending a second configuration signal to the terminal device, wherein, the second configuration signal is for instructing the terminal device to simultaneously detect at least one of the following four types of DCI information:
a first DCI information which contains a Code Block Group indicator and a Code Block Group decoding manner;
a second DCI information which contains a Code Block Group indicator and does not contain a Code Block Group decoding manner;
a third DCI information which contains a Code Block Group decoding manner and does not contain a Code Block Group indicator;
a fourth DCI information which does not contain a Code Block Group indicator or a Code Block Group decoding manner.

Optionally, if the first Transport Block is not a retransmitted Transport Block, the DCI information of the first configuration signal is the first DCI information, the second DCI information, the third DCI information, or the fourth DCI information;
if the first Transport Block is a retransmitted Transport Block, under the condition that the first Transport Block does not contain a second retransmitted Code Block Group which has the same location as the second Code Block Group, the DCI information of the first configuration signal is the first DCI information, the second DCI information, the third DCI information, or the fourth DCI information;
if the first Transport Block is a retransmitted Transport Block, under the condition that the first Transport Block contains a second retransmitted Code Block Group which has the same location as the second Code Block Group and that a preemption indication has been sent to the terminal device, the DCI information of the first configuration signal is the first DCI information, the second DCI information, the third DCI information, or the fourth DCI information.

Optionally, if the first Transport Block is a retransmitted Transport Block, under the condition that the first Transport Block contains a second retransmitted Code Block Group which has the same location as the second Code Block Group and that no preemption indication has been sent to the terminal device, the DCI information of the first configuration signal is the first DCI information or the third DCI information. Optionally, the second configuration signal is also for indicating DCI information to be detected by the terminal device on at least one target signal carrier, wherein, the first Transport Block is transmitted on the at least one target signal carrier.

It should be noted that, the implementation of the respective units can also refer to the corresponding description of the network device in the method embodiments shown in FIG. 3 or FIG. 6.

In the network device of FIG. 9, the network device sends the first configuration signal to the terminal device so as to clearly indicates the CBGs in the first TB as well as the decoding manner of the respective CBGs, which facilitates to increase the correct rate for receiving the CBGs and avoid unnecessary retransmission.

Figure 10:
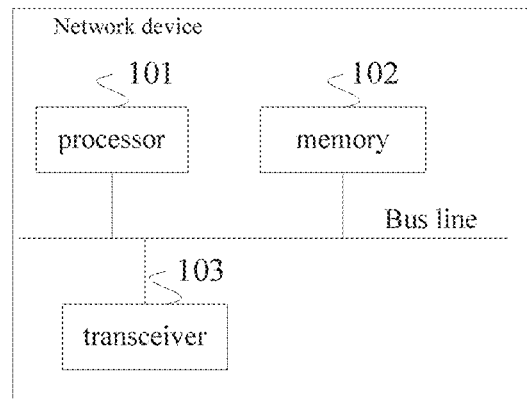
FIG. 10 is a schematic diagram of component structure of another network device provided by the embodiments of the present disclosure.

Referring to FIG. 10, which is a schematic diagram of component structure of another network device provided by the embodiments of the present disclosure, as shown in the figure, the terminal device comprises a processor 101, a memory 102 and a transceiver 103. The processor 101 is connected to the memory 102 and the transceiver 103, for example, the processor 101 is connected to the memory 102 and the transceiver 103 through a bus line.

The processor 101 is configured to support the network device to execute corresponding functions in the configuration method for sending and receiving data as shown in FIG. 3 or FIG. 6. The processor 101 may be a Central Processing Unit (CPU), a Network Processor (NP), a hardware chip, or a combination thereof. The aforementioned hardware chip may be an Application-Specific Integrated Circuit (ASIC), a Programmable Logic Device (PLD), or a combination thereof. The aforementioned PLD may be a Complex Programmable Logic Device (CPLD), a Field-Programmable Gate Array (FPGA), a Generic Array Logic (GAL), or a combination thereof.

The memory 102 is for storing program codes, etc. The memory 102 may comprise a Volatile Memory such as a Random Access Memory (RAM); the memory 102 may also comprise a Non-Volatile Memory such as a Read-Only Memory (ROM), a Flash Memory, a Hard Disk Drive (HDD) or a Solid-State Drive (SSD); the memory 102 may also comprise a combination of the aforementioned types of memory.

The transceiver 103 is for transmitting data.

The processor 101 can calls the program codes to execute the following operations:

sending a first configuration signal to a terminal device via the transceiver 103, wherein, the first configuration signal is for indicating whether a first Transport Block is a retransmitted Transport Block, and the first configuration signal contains DCI information of the first Transport Block;

sending the first Transport Block to the terminal device via the transceiver 103, wherein, the first Transport Block comprises at least one Code Block Group.

It should be noted that, The processor 101 can also execute the operations corresponding to the described network device in the method shown in FIG. 3 or FIG. 6.

The embodiments of the present disclosure also provide a computer storage medium with a computer program stored therein, the computer program comprises program instructions that, when executed by a computer, causes the computer to execute the method described in the aforementioned embodiments. The computer may be a part of the network device mentioned above.

As can be understood by a person skilled in the art, all of or part of the steps in the above-described method embodiments can be implemented by related hardware with instructions of a computer program, the program can be stored in a computer readable storage medium, and when the program is executed, it performs the steps of the above-described method embodiments. Wherein, the storage medium may be a magnetic disk, an optical Disk, a Read-Only Memory (ROM) or a Random Access Memory (RAM).

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A configuration method for sending and receiving data, wherein, the method comprises:

receiving a second configuration signal sent by a network device, wherein, the second configuration signal is for instructing a terminal device to simultaneously detect at least one of the following four types of downlink control information (DCI) information:

a first DCI information which contains a Code Block Group indicator and a Code Block Group decoding manner;

a second DCI information which contains a Code Block Group indicator and does not contain a Code Block Group decoding manner;

a third DCI information which contains a Code Block Group decoding manner and does not contain a Code Block Group indicator;

a fourth DCI information which does not contain a Code Block Group indicator or a Code Block Group decoding manner;

wherein the Code Block Group indicator is for indicating which Code Block Groups are contained in the Transport Block corresponding to the DCI information, and the Code Block Group decoding manner is for indicating a decoding manner for the respective Code Block Groups in the Transport Block corresponding to the DCI information;

receiving a first configuration signal sent by the network device, wherein, the first configuration signal is for indicating whether a first Transport Block to be sent by the network device is a retransmitted Transport Block, and the first configuration signal contains DCI information of the first Transport Block;

receiving the first Transport Block sent by the network device, wherein, the first Transport Block comprises at least one Code Block Group;

decoding the Code Block Group in the first Transport Block according to the DCI information of the first Transport Block.

2. The method according to claim 1, wherein, if the first Transport Block is a retransmitted Transport Block, before decoding the Code Block Group in the first Transport Block, the method further comprises:

determining the Code Block Group contained in the first Transport Block according to the DCI information of the first Transport Block.

3. The method according to claim 1, wherein, when the first Transport Block is a retransmitted Transport Block, before decoding the Code Block Group in the first Transport Block, the method further comprises:

when the DCI information of the first Transport Block does not contain a Code Block Group indicator, determining the Code Block Group contained in the first Transport Block according to a location of a second target Code Block Group in a second Transport Block, wherein, the second target Code Block Group is a Code Block Group which is falsely received in the second Transport Block, the second Transport Block is a received Transport Block with a same Hybrid Automatic Repeat request (HARQ) process number as the first Transport Block.

4. The method according to claim 2, wherein, before receiving the first Transport Block sent by the network device, the method further comprises:
- receiving a preemption indication sent by the network device, wherein, the preemption indication is for indicating part of or all of the time-frequency resource in a second Transport Block that corresponds to a second Code Block Group;
- the step of determining the Code Block Group contained in the first Transport Block according to the DCI information of the first Transport Block comprises:
- if the DCI information of the first Transport Block does not contain a Code Block Group indicator, determining that the Code Block Group contained in the first Transport Block is the second Code Block Group, part of or all of the time-frequency resource of which is occupied by Code Block Groups sent to another terminal device through the network device.

5. The method according to claim 2, wherein, the step of determining the Code Block Group contained in the first Transport Block according to the DCI information of the first Transport Block comprises:
- if the DCI information of the first Transport Block contains a Code Block Group indicator, determining the Code Block Group contained in the first Transport Block according to the Code Block Group indicator in the DCI information of the first Transport Block.

6. The method according to claim 2, wherein, the step of decoding the Code Block Group in the first Transport Block according to the first configuration signal comprises:
- determining a first target Code Block Group in the first Transport Block to be a first retransmitted Code Block Group or a second retransmitted Code Block Group according to the DCI information of the first Transport Block, wherein the first retransmitted Code Block Group is retransmission of a first type of Code Block Group that has been completely sent from a network device to a terminal device but has been falsely received by the terminal device, and the second retransmitted Code Block Group is retransmission of a second type of Code Block Group that has not been completely sent to a terminal device because the time-frequency resource of the Code Block Group in a Transport Block becomes occupied by another service during the process of sending the Transport Block from the network device to the terminal device;
- if the first target Code Block Group is determined to be the first retransmitted Code Block Group, performing combined decoding for the first target Code Block Group with a first Code Block Group, wherein, the first Code Block Group is a Code Block Group having the same location in a second Transport Block as the first target Code Block Group in the first Transport Block, the second Transport Block is a received Transport Block with a same Hybrid Automatic Repeat request (HARQ) process number as that of the first Transport Block;
- if the first target Code Block Group is determined to be the second retransmitted Code Block Group, deleting a second Code Block Group and decoding the second retransmitted Code Block Group, wherein, the second Code Block Group is a Code Block Group having a same location in the second Transport Block as the second retransmitted Code Block Group in the first Transport Block.

7. The method according to claim 6, wherein,
- before receiving the first Transport Block sent by the network device, the method further comprises:
- receiving a preemption indication sent by the network device, wherein, the preemption indication is for indicating part of or all of the time-frequency resource in the second Transport Block that corresponds to the second Code Block Group;
- the step of determining a first target Code Block Group in the first Transport Block to be a first retransmitted Code Block Group or a second retransmitted Code Block Group according to the DCI information of the first Transport Block comprises:
- if the DCI information of the first Transport Block does not contain a Code Block Group decoding manner, determining that the Code Block Group having a same location as that of the second Code Block Group is the second retransmitted Code Block Group, wherein, part of or all of the time-frequency resource of the second Code Block Group is occupied by Code Block Groups sent to another terminal device through the network device.

8. The method according to claim 6, wherein, the step of determining a first target Code Block Group in the first Transport Block to be a first retransmitted Code Block Group or a second retransmitted Code Block Group according to the DCI information of the first Transport Block comprises:
- if the DCI information of the first Transport Block contains a Code Block Group decoding manner, determining the first target Code Block Group in the first Transport Block to be the first retransmitted Code Block Group or the second retransmitted Code Block Group according to the Code Block Group decoding manner in the DCI information of the first Transport Block;
- if the DCI information of the first Transport Block does not contain a Code Block Group decoding manner and there is no preemption indication received, determining all Code Block Groups in the first Transport Block to be the first retransmitted Code Block Group.

9. The method according to claim 2, wherein, the method further comprises:
- determining whether the DCI information of the first Transport Block contains at least one of a Code Block Group indicator or a Code Block Group decoding manner according to an information domain size and/or a DCI format of the DCI information of the first Transport Block; or
- determining whether the DCI information of the first Transport Block contains at least one of a Code Block Group indicator or a Code Block Group decoding manner according to whether a preset indicator bit exists in the DCI information of the first Transport Block; or
- determining whether the DCI information of the first Transport Block contains at least one of a Code Block Group indicator or a Code Block Group decoding manner according to a signal carrier that the first Transport Block is on.

10. The method according to claim 1, wherein, the step of receiving a first configuration signal sent by a network device comprises:
- seeking to acquire the first configuration signal that contains the DCI information of the first Transport Block from Physical Downlink Control Channel (PDCCH)

information according to at least one preset information domain size of DCI information and at least one preset DCI format.

11. The method according to claim 10, wherein, the step of seeking to acquire the first configuration signal that contains the DCI information of the first Transport Block from PDCCH information according to at least one preset information domain size of DCI information and at least one preset DCI format comprises:
seeking to acquire the first configuration signal that contains the DCI information of the first Transport Block from PDCCH information according to the second configuration signal in combination with the at least one preset information domain size of DCI information and at least one preset DCI format.

12. The method according to claim 10, wherein, the at least one preset information domain size of DCI information and at least one preset DCI format comprises:
one type of information domain size of DCI information and at least two different types of DCI formats; or
at least two different types of information domain sizes of DCI information and one type of DCI format; or
at least two different types of information domain sizes of DCI information and at least two different types of DCI formats.

13. A configuration method for sending and receiving data, wherein, the method comprises:
sending a second configuration signal to a terminal device, wherein, the second configuration signal is for instructing the terminal device to simultaneously detect at least one of the following four types of downlink control information (DCI) information:
a first DCI information which contains a Code Block Group indicator and a Code Block Group decoding manner;
a second DCI information which contains a Code Block Group indicator and does not contain a Code Block Group decoding manner;
a third DCI information which contains a Code Block Group decoding manner and does not contain a Code Block Group indicator;
a fourth DCI information which does not contain a Code Block Group indicator or a Code Block Group decoding manner;
wherein the Code Block Group indicator is for indicating which Code Block Groups are contained in the Transport Block corresponding to the DCI information, and the Code Block Group decoding manner is for indicating a decoding manner for the respective Code Block Groups in the Transport Block corresponding to the DCI information;
sending a first configuration signal to the terminal device, wherein, the first configuration signal is for indicating whether a first Transport Block is a retransmitted Transport Block, and the first configuration signal contains DCI information of the first Transport Block;
sending the first Transport Block to the terminal device, wherein, the first Transport Block comprises at least one Code Block Group.

14. The method according to claim 13, wherein, before sending the first Transport Block to the terminal device, the method further comprises:
sending a preemption indication to the terminal device, wherein, the preemption indication is for indicating part of or all of the time-frequency resource in a second Transport Block that corresponds to a second Code Block Group,
wherein, the second Transport Block is a Code Block Group already sent to the terminal device and having a same Hybrid Automatic Repeat request (HARQ) process number as that of the first Transport Block, part of or all of the time-frequency resource corresponding to the second Code Block Group is occupied by Code Block Groups sent to another terminal device.

15. The method according to claim 13, wherein,
if the first Transport Block is not a retransmitted Transport Block, the DCI information of the first configuration signal is selected from the first DCI information, the second DCI information, the third DCI information, and the fourth DCI information;
if the first Transport Block is a retransmitted Transport Block, under the condition that the first Transport Block does not contain a second retransmitted Code Block Group which has a same location as the second Code Block Group, the DCI information of the first configuration signal is the first DCI information, the second DCI information, the third DCI information, or the fourth DCI information;
if the first Transport Block is a retransmitted Transport Block, under the condition that the first Transport Block contains a second retransmitted Code Block Group which has a same location as the second Code Block Group and that a preemption indication has been sent to the terminal device, the DCI information of the first configuration signal is selected from the first DCI information, the second DCI information, the third DCI information, and the fourth DCI information;
if the first Transport Block is a retransmitted Transport Block, under the condition that the first Transport Block contains a second retransmitted Code Block Group which has a same location as the second Code Block Group and that no preemption indication has been sent to the terminal device, the DCI information of the first configuration signal is selected from the first DCI information and the third DCI information.

16. The method according to claim 15, wherein, the second configuration signal is also for indicating DCI information to be detected by the terminal device on at least one target signal carrier, wherein, the first Transport Block is transmitted on the at least one target signal carrier.

17. A terminal device, wherein, the terminal device comprises a processor and a transceiver,
the transceiver is for receiving a second configuration signal sent by a network device, wherein, the second configuration signal is for instructing the terminal device to simultaneously detect at least one of the following four types of downlink control information (DCI) information:
a first DCI information which contains a Code Block Group indicator and a Code Block Group decoding manner;
a second DCI information which contains a Code Block Group indicator and does not contain a Code Block Group decoding manner;
a third DCI information which contains a Code Block Group decoding manner and does not contain a Code Block Group indicator;
a fourth DCI information which does not contain a Code Block Group indicator or a Code Block Group decoding manner;
wherein the Code Block Group indicator is for indicating which Code Block Groups are contained in the Transport Block corresponding to the DCI information, and the Code Block Group decoding manner is for indicating a decoding manner for the respective Code Block Groups in the Transport Block corresponding to the DCI information;

the transceiver is also for receiving a first configuration signal sent by a network device, wherein, the first configuration signal is for indicating whether a first Transport Block to be sent by the network device is a retransmitted Transport Block, and the first configuration signal contains DCI information of the first Transport Block;

the transceiver is also for receiving the first Transport Block sent by the network device, wherein, the first Transport Block comprises at least one Code Block Group;

the processor is for decoding the Code Block Group in the first Transport Block according to the DCI information of the first Transport Block.

* * * * *